(12) United States Patent
Shantharam et al.

(10) Patent No.: US 12,339,951 B2
(45) Date of Patent: *Jun. 24, 2025

(54) ENFORCING POLICIES FOR UNMANAGED APPLICATIONS

(71) Applicant: Omnissa, LLC, Mountain View, CA (US)

(72) Inventors: Shravan Shantharam, Cumming, GA (US); Kalyan Regula, Alpharetta, GA (US); Joshua Dobelstein, Suwanee, GA (US); Sharath Chowdary Gude, Atlanta, GA (US); Nigitha Alugubelli, Atlanta, GA (US); Xueliang Hua, Atlanta, GA (US)

(73) Assignee: Omnissa, LLC, Mountain View, CA (US)

( * ) Notice: Subject to any disclaimer, the term of this patent is extended or adjusted under 35 U.S.C. 154(b) by 294 days.

This patent is subject to a terminal disclaimer.

(21) Appl. No.: 17/664,258

(22) Filed: May 20, 2022

(65) Prior Publication Data

US 2022/0277071 A1    Sep. 1, 2022

Related U.S. Application Data

(63) Continuation of application No. 16/229,142, filed on Dec. 21, 2018, now Pat. No. 11,341,233.

(51) Int. Cl.
*G06F 21/51* (2013.01)
*G06F 8/65* (2018.01)
(Continued)

(52) U.S. Cl.
CPC ............... *G06F 21/51* (2013.01); *G06F 8/65* (2013.01); *H04L 41/0803* (2013.01);
(Continued)

(58) Field of Classification Search
CPC ...... G06F 21/51; G06F 8/65; G06F 2221/033; H04L 41/0803; H04L 41/0893; H04L 41/20; H04L 41/28; H04L 41/00
See application file for complete search history.

(56) References Cited

U.S. PATENT DOCUMENTS

| 8,161,162 B1 * | 4/2012 | Sutherland | ............ | H04L 63/029 709/227 |
| 8,239,915 B1 * | 8/2012 | Satish | ..................... | G06F 21/00 726/4 |

(Continued)

OTHER PUBLICATIONS

Jenkov, "Java NIO Files", http://tutorials.jenkov.com/java-nio/files.html (Year: 2015).*

(Continued)

*Primary Examiner* — Kaveh Abrishamkar
*Assistant Examiner* — Howard H. Louie
(74) *Attorney, Agent, or Firm* — Kim & Stewart LLP (57) ABSTRACT

Disclosed are various approaches for enforcing policies for unmanaged applications. A user supplied script can be evaluated to determine whether an application is installed on a computing device. In response to a determination that the application is installed on the computing device, a request can be sent to a management service for at least one policy applicable to the application. The policy can be evaluated to determine whether the application complies with the policy.

20 Claims, 3 Drawing Sheets

(51) Int. Cl.
    *H04L 41/00*          (2022.01)
    *H04L 41/0803*       (2022.01)
    *H04L 41/0893*       (2022.01)
    *H04L 41/28*          (2022.01)

(52) U.S. Cl.
    CPC .......... *H04L 41/0893* (2013.01); *H04L 41/20* (2013.01); *H04L 41/28* (2013.01); *G06F 2221/033* (2013.01)

(56) References Cited

U.S. PATENT DOCUMENTS

| | | | |
|---|---|---|---|
| 9,680,833 B2 * | 6/2017 | Dulce | H04L 63/10 |
| 9,734,312 B1 * | 8/2017 | Salehpour | G06F 8/61 |
| 2006/0224544 A1 | 10/2006 | Keith, Jr. | |
| 2007/0289019 A1 * | 12/2007 | Lowrey | G06F 21/554 |
| | | | 726/24 |
| 2010/0242088 A1 | 9/2010 | Thomas | |
| 2011/0088025 A1 | 4/2011 | Basmov et al. | |
| 2013/0067452 A1 * | 3/2013 | Hwang | H04L 41/843 |
| | | | 717/172 |
| 2014/0032691 A1 * | 1/2014 | Barton | H04W 12/08 |
| | | | 709/206 |
| 2014/0180711 A1 * | 6/2014 | Kamen | G16H 40/63 |
| | | | 705/2 |

OTHER PUBLICATIONS

Jenkov, "Java NIO Files", http://tutorials.jenkov.com/java-nio/files.html, 2015 (Year: 2015).

* cited by examiner

ENFORCING POLICIES FOR UNMANAGED APPLICATIONS

CROSS-REFERENCE TO RELATED APPLICATIONS

This application is a continuation of and claims the benefit of U.S. patent application Ser. No. 16/229,142, entitled "ENFORCING POLICIES FOR UNMANAGED APPLICATIONS," and filed Dec. 21, 2018, which is hereby incorporated by reference in its entirety.

BACKGROUND

Enterprise mobility management (EMM) systems provide organizations with the ability to manage mobile devices used by members of the organization. For example, EMM systems can be used to enforce compliance with various policies set by an enterprise. These policies can specify which applications are installed on a managed device, which versions of an approved application can be installed on a manage device, updating or upgrading an installed application, or other restrictions or requirements.

However, some devices allow for users to install applications independently of the EMM system. For example, some mobile devices allow for applications to be installed outside of an approved application store, which is often referred to as "side-loading" an application. Likewise, PC operating systems often allow for users to install or execute arbitrary applications from any source, so long as the user has access to an installer for the application. Because these applications can be installed independently of the EMM system, the EMM system is often limited in its ability to manage the application or its compliance

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for allowing EMM systems to enforce policies or otherwise assume management of unmanaged applications installed on a computing device. An application may be considered to be unmanaged if it is installed or installable independently of an EMM system. Because such applications can be installed independently of the EMM system, the EMM system may not be aware of the presence of the application or the requirements for managing the application. Moreover, the presence of independently installed applications allows for users to bypass security and policy restrictions enforced for applications managed by the EMM system. Therefore, various implementations of this disclosure allow for EMM systems to assume management of these unmanaged applications.

Figure 1:
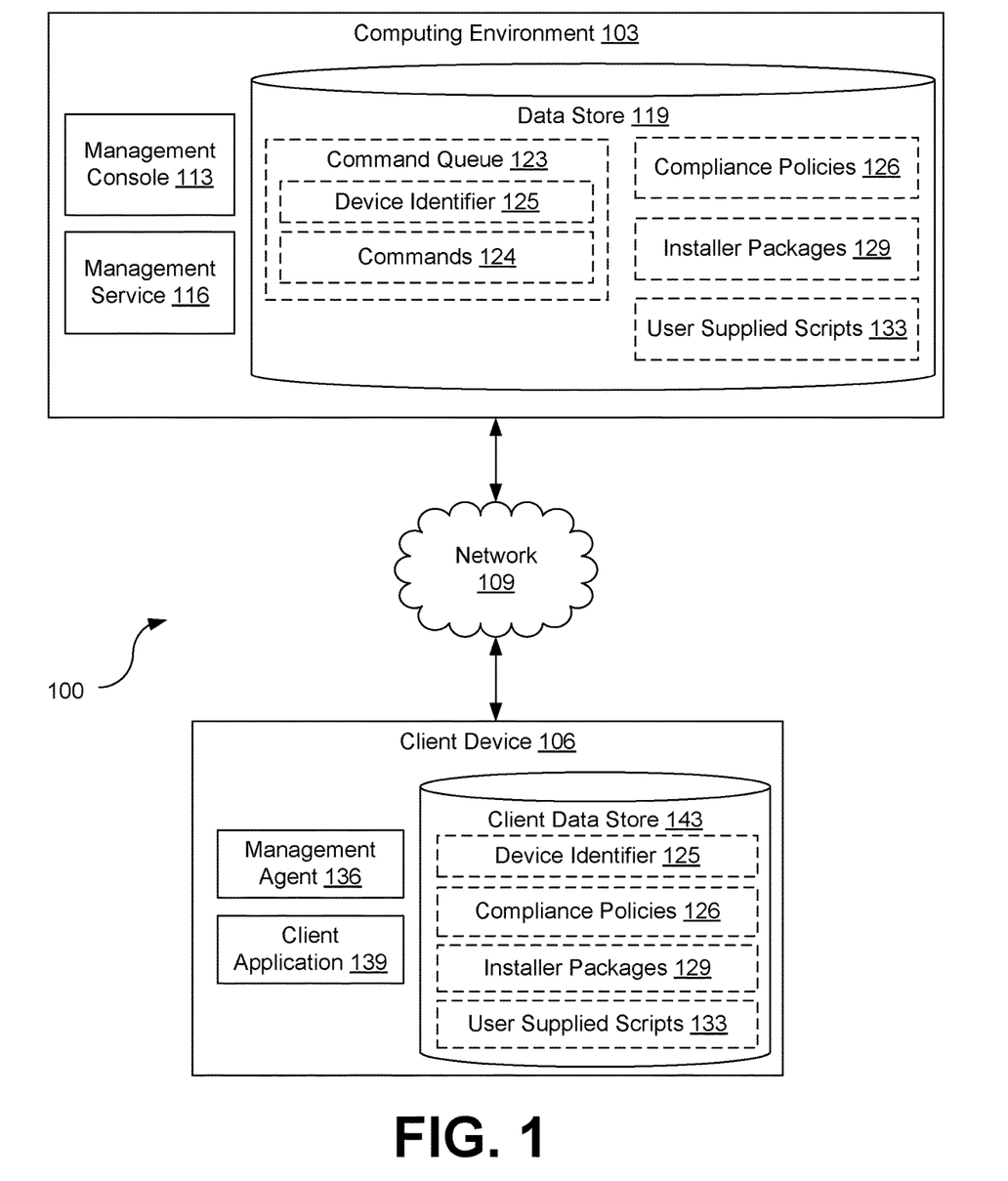
FIG. 1 is a schematic block diagram depicting an example of a network environment.

Beginning with FIG. 1, shown is an example of a networked environment 100. The networked environment 100 includes a computing environment 103 and a client device 106, which are in data communication with each other across a network 109. The network 109 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various examples. The components executed in the computing environment 103, for example, can include a management console 113 and a management service 116. Other components or applications may also be executed in the computer environment (e.g., hypervisors managing one or more virtual machines that host the management console 113 or the management service 116) in various embodiments of the present disclosure.

Also, various data is stored in a data store 119 that is accessible to the computing environment 103. The data store 119 can be representative of a plurality of data stores, which can include relational databases, object-oriented databases, hierarchical databases, hash tables or similar key-value data stores, as well as other data storage applications or data structures. The data stored in the managed data store 119 is associated with the operation of the management console 113, the management service 116, as well as potentially other applications or functional entities described later. This data can include one or more command queues 123, compliance policies 126, installers 129, user supplied scripts 133, and potentially other data.

The management console 113 can provide an administrative interface for configuring the operation of the management service 116 and the configuration of client devices 106 that are administered by the management service 116. Accordingly, the management console 113 can correspond to a web page or web application provided by a web server hosted in the computing environment 103. For example, the management console 113 can provide an interface for an administrative user to select compliance policies 126 to be applied to individual client devices 106, create compliance policies 126, upload or specify the location for installers 129 or user supplied scripts 133, as well as various other actions related to the operation of various implementations.

The management service 116 can administer the operation of client devices 106 registered or otherwise enrolled with the management service 116. To this end, the management service 116 can also provide mechanisms for a client device 106 to enroll or otherwise register with the management service 116. The management service 116 can also enforce the use of various compliance policies 126, for example, by creating a command 124 in a command queue 123 associated with a client device 106 that specifies that a particular compliance policy 126 should be applied to the client device 106.

The command queue 123 can represent a queue where one or more commands 124 to be executed by a client device 106 can be stored. For example, the management service 116 may issue one or more commands 124 to be performed by the client device 106 or an application executed on the client device 106. The commands 124 can be stored in the command queue 123 until the commands 124 are requested by the client device 106, as described later. In some instances, a separate command queue 123 can be created for each client device 106. In these instances, each command queue 123 can include a device identifier 125 that links the command queue 123 to a respective client device 106.

The device identifier 125 can include any identifier that uniquely identifies a client device 106 enrolled with the management service 116 with respect to another client device 106 enrolled with the management service 116. For example, a device identifier 125 can include device serial numbers, media access control (MAC) addresses of network interfaces, international mobile equipment identity (IMEI) numbers for the client device 106, unique identification numbers assigned by the management service 116 (e.g., globally unique identifiers (GUIDs), universally unique identifiers (UUIDs), etc.), or other types of identifiers.

The compliance policies 126 specify various configuration details for a client device 106. For example, a compliance policy 126 could specify that a particular application or version of the application be installed on the client device 106. As another example, a compliance policy 126 could specify that certain versions of an application (e.g., a version with a known security defect) are not authorized to be installed on the client device 106. In some instances, the compliance policy 126 could also specify that particular features of an application must be installed on the client device 106 or that specific features of an application are not to be installed on the client device 106. Similarly, the compliance policy 126 may specify that an application installed on the client device 106 can only be made available for specified users or groups of users.

A compliance policy 126 can also specify a remedial action to be performed in the event of a violation of the compliance policy 126. For example, the compliance policy 126 could specify as a remedial action that an unauthorized or prohibited version of an application should be removed from the client device 106 or updated to an approved version of the application. Similarly, the compliance policy 126 could specify that an unauthorized feature of the application be uninstalled from the client device 106 or otherwise disabled.

The installer packages 129 provide a software component that includes installation information for a corresponding application to be installed by the installer package 129 and, optionally, the files for the application itself. For example, an installer package 129 could include information regarding the file path in which to install an application, any necessary dependencies (e.g., libraries or library versions) for installation of the corresponding application, and information regarding optional features, components, or libraries of the corresponding application that may be installed. Likewise, the installer package 129 can specify where installation files can be retrieved (e.g., a network address from which files can be downloaded) or the installer package 129 can include the installation files themselves. In addition, the installer package 129 can allow for customization of the installation of the corresponding application (e.g., on a per-user basis, for all users of the computing device, etc.). Examples of installer packages 129 include Windows Installer Packages for MICROSOFT WINDOWS® systems, Redhat Package Manager (RPM) packages for various Linux based distributions, and similar installer packages 129 for other systems.

The user supplied scripts 133 are user supplied instructions that can be evaluated to determine whether an application is installed on a client device 106. In some instances, a user supplied script 133 could include executable code that can perform the necessary operations to determine whether an application is installed on the client device 106. In other instances, the user supplied script 133 could provide a checklist of items to evaluate in order to determine whether an application is installed on the client device 106. For example, the user supplied script 133 could include executable code to check for the presence of a particular file and file version at a specific file path location, or the user supplied script 133 could specify the name of a file and a file path which another application could check in order to determine whether or not an application is installed. The user supplied script 133 could similarly specify a WINDOWS Registry key to check, or include executable instructions that check, for the presence of a WINDOW Registry key associated with installation of the application.

The client device 106 is representative of a plurality of client devices 106 that can be coupled to the network 109. The client device 106 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection. The client device 106 can be configured to execute various applications, such as a management agent 136 and a client application 139.

The management agent 136 can maintain data communication with the management service 116 in order to perform various actions on the client device 106 in response to instructions received from the management service 116. In some instances, the management agent 136 includes a separate application executing on the client device 106. In other instances, the management agent 136 includes a mobile device management (MDM) framework provided by or included in the operating system installed on the client device 106. The management agent 136 can be configured to communicate with the management service 116 to enroll or otherwise register the client device 106 with the management service 116. The management agent 136 can also be configured to contact the management service 116 at periodic intervals and request that the management service 116 send any commands or instructions to the management agent 136. For example, the management agent 136 could retrieve one or more commands 124 stored in a command queue 123 associated with the client device 106. The management agent 136 can then cause the client device 106 to perform the commands 124 provided by the management service 116.

The client application 139 can cause a user interface to be rendered on the display of the client device 106. For example, the client application 139 could be a web browser and the user interface could include a web page rendered within a browser window. This could include a web browser rendering a web-page supplied by the management console 113. As another example, the client application 139 could be a standalone application that renders a user interface using user-interface elements or widgets provided by a library or by the operating system (e.g., MICROSOFT WINDOWS) installed on the client device 106.

The client device 106 may also have a client data store 143 that is accessible to applications executing on the client device 106. The client data store 143 can be representative of a plurality of data stores, which can include relational databases, object-oriented databases, hierarchical databases, hash tables or similar key-value data stores, as well as other data storage applications or data structures. The data stored in the client data store 143 is associated with the operation of the management agent 136, the client application 139, as well as potentially other applications or functional entities described later. This data can include the device identifier 125 for the client device 106, one or more compliance policies 126, installer packages 129, user supplied scripts 133, and potentially other data.

Next, a general description of the operation of the various components of the networked environment 100 is provided. A more detailed description of the implementations of various examples of the present disclosure is provided later in the discussion of the subsequent figures.

To begin, an administrative user submits through the management console 113 the identity of an unmanaged client application 139 which the administrative user wishes to have the management service 116 assume management of. For example, the administrative user may create a compliance policy 126 that specifies that a specific version of the unmanaged client application 139 is to be installed on the client device 106. As part of the creation of the compliance policy 126, the administrative user may upload an installer package 129 for the client application 139 or specify a location where the installer package 129 may be found. For example, the administrative user could specify a network address from which the installer package 129 may be downloaded or a file path or other location in the client data store 143 where the installer package 129 may be located (e.g., due to the inclusion of the installer package 129 in a machine image). The administrative user may also upload a user supplied script 133 to allow for the presence or installation of the client application 139 to be detected on the client device 106.

In addition, a client device 106 is enrolled with the management service 116. As part of the enrollment process, the management service 116 sends a management agent 136 to the client device 106 for installation on the client device 106. In some instances, the management service 116 may also assign a device identifier 125 to the client device 106, which can be stored in the client data store 143. The management agent 136 then sends a request to a command queue 123 associated with the client device 106 for one or more commands 124 to be processed or executed by the management agent 136 on the client device 106. These commands 124 can include one or more compliance policies 126 to be implemented or enforced by the management agent 136.

For example, when the management agent 136 implements a compliance policy 126 that specifies that the management agent 136 is to manage a client application 139, the management agent 136 may perform a number of related actions. For instance, the management agent 136 could evaluate a user supplied script 133 to determine whether or not the client application 139 is installed on the client device 106.

If the client application 139 is not currently installed on the client device 106, the management agent 136 could then use an installer package 129 specified by the compliance policy 126 to install and configure the client application 139. For example, if the compliance policy 126 specifies a folder or file path on the client device 106 that contains the installer package 129 (e.g., due to the inclusion of the installer package 129 in a machine image), the management agent 136 could execute the installer package 129 to install the client application 139. Likewise, the management agent 136 could download the installer package 129 from the data store 119 in the computing environment 103 if the compliance policy 126 specified a network address at which the installer package 129 was available. The management agent 136 could then execute the installer package 129 to install the client application 139.

However, if the client application 139 is determined to be currently installed on the client device 106, then the management agent 136 could determine whether the installation of the client application 139 satisfies the compliance policy 126. For example, if the version of the client application 139 were installed, the management agent 136 could execute an appropriate installer package 129 to update or rollback the current version of the client application 139 to the approved version of the client application 139. As another example, if the version of the client application 139 were configured in a manner that violated the compliance policy 126 (e.g., unauthorized features were installed or the client application 139 were available to prohibited users or groups of users), then the management agent 136 could invoke the installer package 129 specified in the compliance policy 126 to modify the installation of the client application 139 to comply with the requirements of the compliance policy 126.

As the compliance policy 126 for the client application 139 is updated over time, the management service 116 may insert new commands 124 in the command queue 123 for the client device 106. The new commands 124 could include a new version of the compliance policy 126 to be transmitted to the management agent 136. When the management agent 136 receives the new version of the compliance policy 126, an appropriate action may be taken. For example, a compliance policy 126 may be updated to specify that a new version of the client application 139 is to be installed and that a new version of the installer package 129 is available at a new location. The management agent 136 could then execute or otherwise invoke the new version of the installer package 129 at the new location to update the client application 139 to the new version specified in the compliance policy 126. Similarly, an updated compliance policy 126 could specify that the client application 139 is prohibited from being installed on the client device 106, in which case the management agent 136 could use the installer package 129 to uninstall the client application 139 form the client device 106.

Figure 2:
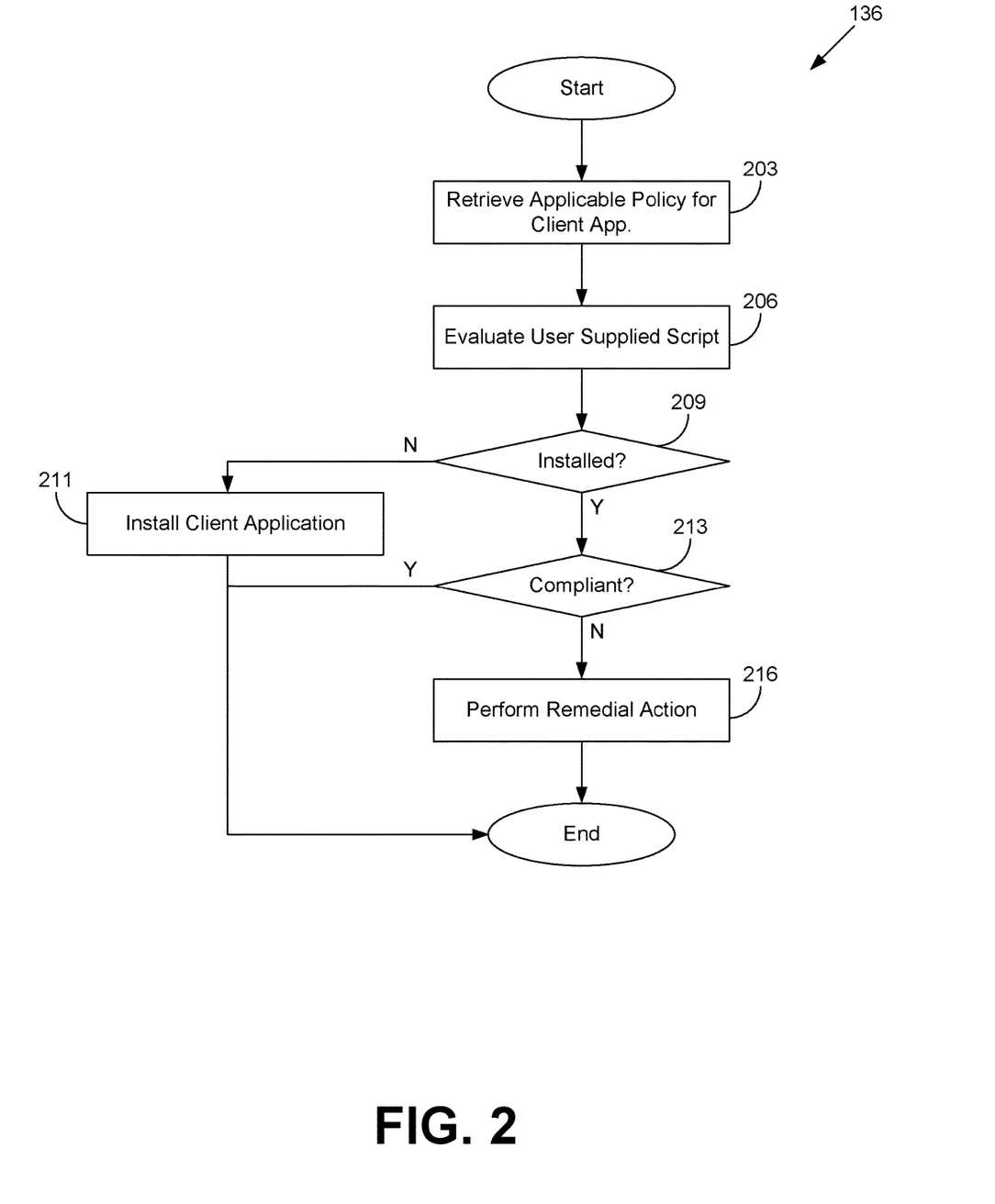
FIG. 2 is a flowchart depicting the operation of an example of a component of the client device of the network environment of FIG. 1.

Referring next to FIG. 2, shown is a flowchart that provides one example of the operation of a portion of the management agent 136 according to various embodiments. It is understood that the flowchart of FIG. 2 provides merely an example of the many different types of functional arrangements that may be employed to implement the operation of the portion of the management agent 136 as described herein. As an alternative, the flowchart of FIG. 2 may be viewed as depicting an example of elements of a method implemented in the computing environment 103 according to one or more embodiments.

Beginning with step 203, the management agent 136 retrieves one or more compliance policies 126 applicable to the client application 139. The applicable compliance policies 126 could be received or retrieved in a number of scenarios using a variety of mechanisms. For example, upon initial enrollment of the client device 106 with the management service 116, the management service 116 may insert one or more commands 124 into a command queue 123 associated with the client device 106. Each command 124 could specify or include a specific compliance policy 126 to be enforced by the management agent 136 on the client device 106 or a single command 124 could specify or include multiple compliance policies 126 to be enforced by the management agent 136.

A compliance policy 126 could specify how the presence of a client application 139 can be detected. For instance, the compliance policy 126 could provide a user supplied script 133, which the management agent 136 could evaluate or otherwise execute in order to determine whether the client application 139 is installed on the client device 106. As another example, the compliance policy 126 could specify particular file paths or registry keys to check in order to determine whether or not a client application 139 is installed on the client device 106.

Next at step 206, the management agent 136 can evaluate or otherwise execute the user supplied script 133 specified in the compliance policy 126. For example, if the user supplied script 133 were computer-executable code that determined whether or not the client application 139 were installed on the client device 106, the management agent 136 could execute the code (e.g., by executing the script with an interpreter) in order to determine whether or not the client application 139 were installed on the client device 106. As another example, if the management agent 136 specified particular settings or values to check (e.g., the presence of a specific filename in a specific folder in a specific filepath or the presence of a specific registry key), then the management agent 136 could check for the presence or absence of the particular settings or values.

Then at step 209, the management agent 136 can determine, based on the user supplied script 133, whether or not the client application 139 is installed on the client device 106. For example, if the user supplied script 133 returned a value indicating that the client application 139 were not installed on the client device 106, then the management agent 136 could determine that that client application 139 was not installed on the client device 106. Likewise, if the user supplied script 133 specified particular settings or values to check, then the management agent 136 could determine whether or not the client application 139 were installed based on the presence or absence of the settings or values. If the management agent 136 determines that the client application 139 is not installed on the client device 106, then the process proceeds to step 211. However, if the management service 136 determines that the client application 139 is installed on the client device 106, then the process proceeds to step 213.

Proceeding to step 211, the management agent 136 can cause the installer package 129 for the client application 139 to execute and install the client application 139 on the client device. For example, the compliance policy 126 could also specify the name and the location of the installer package 129 (e.g., a specific network address or a specific file path on the client device 106). The management agent 136 could then retrieve or begin execution of the specified installer package 129. As another example, the management agent 136 could send a request to the management service 116 for a copy of the installer package 129. The management agent 136 could then retrieve a command 124 from the command queue 123 that includes the installer package 129 to be executed. After the installer package 129 is executed, the management agent 136 may configure the newly installed client application 139 to comply with the requirements specified in one or more compliance policies 126. The process then ends.

However, if the process instead proceeds to step 213, the management agent 136 can evaluate the current installation of the client application 139 to determine whether or not the client application 139 complies with the requirements specified in the compliance policy 126. For example, the compliance policy 126 could specify that a specific version of the client application 139 be installed or that specific components of the client application 139 be installed. If the management agent 136 determines that the current installation of the client application 139 complies with the requirements of the compliance policy 126, then the process ends. However, if the current installation of the client application 139 is not compliant, then the process proceeds to step 216.

Then at step 216, the management agent 136 can perform a remedial action to place the installation of the client application in compliance with the requirements specified by the compliance policy 126. For example, if the compliance policy 126 requires that the client application 139 be configured in a particular manner, the management agent 136 could execute the installer package 129 to modify or repair the installation of the client application 139 in order to bring it into compliance with the compliance policy 126. Similarly, if the compliance policy 126 requires that a specific version of the client application 139 be installed, then the management agent 136 could initiate execution of the installer package 129 to upgrade the client application 139 to the version specified by the compliance policy 126. Other remedial actions may also be performed as required to bring the installation of the client application 139 into compliance with the compliance policy 126. After the appropriate remedial action is performed, the process then ends.

Figure 3:
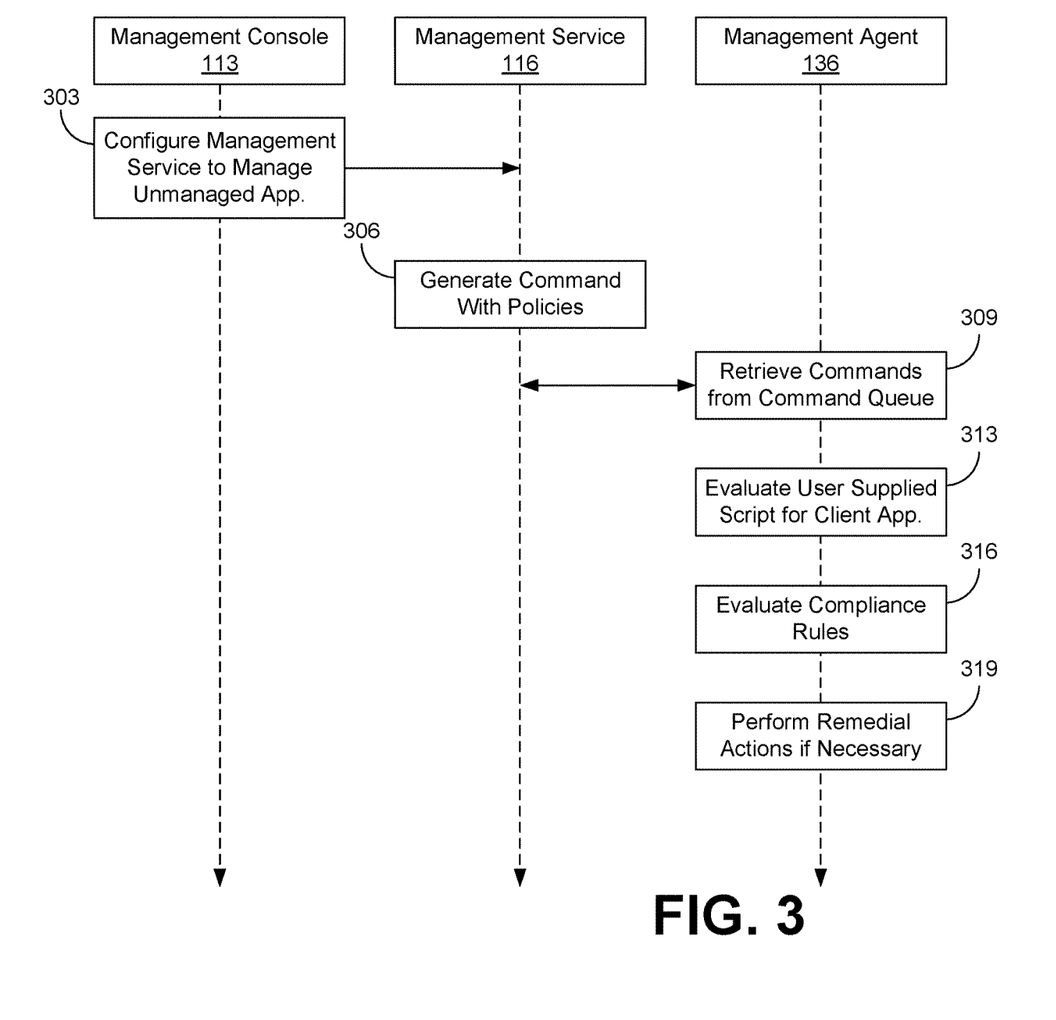
FIG. 3 is a sequence diagram depicting the operation of an example of a component of the client device of the network environment of FIG. 1.

FIG. 3 depicts a sequence diagram between the various components depicted in the network environment 100 of FIG. 1. It is understood that the sequence of interactions between the various applications depicted in FIG. 3 is only an example of many potential sequences of interactions between the various applications depicted in FIG. 1. Other sequences of interactions may also be performed in specific implementations or scenarios.

Beginning at step 303, the management console 113 can configure the management service 116 to assume management of a previously unmanaged client application 139. For example, an administrative user could use a web page or similar user interface to identify the name of the client application 139 to be managed, upload a user supplied script 133 to detect whether the client application 139 is installed on the client device 106, and create one or more compliance policies 126 related to or otherwise applicable to the client application 139.

Next at step 306, the management service 116 can create one or more commands 124 related to the client application 139. For example, the management service 116 could create a command 124 specifying the compliance policy 126 created for the client application 139 and the user supplied script 133. The management service 116 could then insert the command 124 into a command queue 123 associated with a client device 106.

Then at step 309, the management agent 136 can retrieve the commands 124 from the command queue 123. For example, the management agent 136 could send a request to the management service 116 for all commands 124 currently pending in the command queue 123. In response, the management service 116 could provide the commands 124 to the management agent 136 and then remove the commands 124 from the command queue 123.

Moving on to step 313, the management agent 136 can evaluate the user supplied script 133 specified in a compliance policy 126 to determine whether or not the client application 139 is currently installed on the client device 106. Various approaches for determining whether or not the client application 139 is currently installed are previously described in the discussion of FIG. 2.

Proceeding to step 316, after determining that the client application 139 is installed, or in some instances after installing the client application 139 using an installer package 129 for the client application 139, the management agent 136 can evaluate a compliance rule 126 and determine whether or not the client application 139 is in a state of compliance with the compliance rule 126. For example, the management agent 136 could determine whether a minimum version or specific version, as specified by a compliance rule 126, of the client application 139 is installed. As another example, the management agent 136 could determine whether client application 139 is configured in a manner specified by the compliance rule 126 (e.g., required components are installed or prohibited components are not installed).

Then at step 319, the management agent 136 can then execute a remedial action to bring the installation of the client application 139 into a compliant state, if necessary. For example, the management agent 136 could cause an installer package 129 for the client application 139 to execute. The installer package 129 could upgrade the version of the client application 139 to the version specified by the compliance rule 126, add components indicated by the compliance rule 126, remove components specified by the compliance rule 126, or perform other remedial actions as desired.

The flowchart of FIG. 2 and the sequence diagram of FIG. 3 show examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIG. 2 and the sequence diagram of FIG. 3 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All Therefore, the following is claimed:

1. A system, comprising:
   a computing device comprising a processor and a memory; and
   machine readable instructions stored in the memory that, when executed by the processor, cause the computing device to at least:
   enroll the computing device for management by a management service by downloading and installing a management agent on the computing device, wherein the management agent enforces policies on managed applications on the computing device managed by the management service and does not enforce policies on unmanaged applications on the computing device not managed by the management service;
   receive, by the management agent from the management service, a command to assume management of an application that was previously not managed by the management service, at least one policy for the application to be managed by the management service, and a user supplied script used to determine whether the application is already installed on the computing device as an unmanaged application of the unmanaged applications;
   execute, by the management agent, the user supplied script received from the management service to determine whether the application is installed on the computing device as the unmanaged application by detecting a presence of a filename in a specific folder in a specific filepath specified by the user supplied script;
   in an instance in which it is determined that the application is not installed on the computing device, execute an installer package specified by the at least one policy to install the application on the computing device and configure the installed application to comply with the at least one policy;
   in an instance in which it is determined that the application is installed on the computing device as the unmanaged application:
      evaluate the at least one policy to determine whether the application complies with the at least one policy, wherein the at least one policy specifies a particular configuration of the application; and
      in response to determining that the application fails to comply with the at least one policy, modify a configuration of the application to be consistent with the particular configuration.

2. The system of claim 1, wherein the user supplied script, when evaluated by the computing device, causes the computing device to at least:
   determine that a registry key specified in the user supplied script exists within a registry provided by an operating system of the computing device.

3. The system of claim 1, wherein the user supplied script, when evaluated by the computing device, causes the computing device to at least:
   determine that a file specified in the user supplied script exists in a file path specified in the user supplied script.

4. The system of claim 1, wherein the machine readable instructions, when executed by the processor, further cause the computing device to perform a compliance action in response to a determination that the application fails to comply with the policy.

5. The system of claim 4, wherein the machine readable instructions, when executed by the processor, further cause the computing device to determine that the installer package for the application is available at a predefined location.

6. The system of claim 5, wherein:
   the compliance action is an upgrade of the application; and
   the machine readable instructions cause the computing device to perform the upgrade of the application using the installer package for the application.

7. The system of claim 5, wherein:
   the compliance action is an uninstall of the application; and
   the machine readable instructions cause the computing device to perform the uninstall of the application using the installer package for the application.

8. The system of claim 1, wherein receiving, by the management agent from the management service, a command to assume management of an application that was previously not managed by the management service further comprises:
   reading, by the management agent, the command from a command queue, wherein the management service writes commands into the command queue for execution on the computing device, and wherein the management agent periodically reads the commands from the command queue and executes the commands on the computing device.

9. A method, comprising:
   enrolling a computing device for management by a management service by downloading and installing a management agent on the computing device, wherein the management agent enforces policies on managed applications on the computing device managed by the management service and does not enforce policies on unmanaged applications on the computing device not managed by the management service;
   receiving, by the management agent executing on the computing device from the management service, a command to assume management of an application that was previously not managed by the management service, at least one policy for the application to be managed by the management service, and a user supplied script used to determine whether the application is already installed on the computing device as an unmanaged application of the unmanaged applications;
   executing, by the management agent, the user supplied script received from the management service to determine whether the application is installed on the computing device as the unmanaged application by detecting a presence of a filename in a specific folder in a specific filepath specified by the user supplied script;
   in an instance in which it is determined that the application is not installed on the computing device, executing an installer package specified by the at least one policy to install the application on the computing device and configure the installed application to comply with the at least one policy;
   in an instance in which it is determined that the application is installed on the computing device as the unmanaged application:
      evaluating the at least one policy to determine whether the application complies with the at least one policy, wherein the at least one policy specifies a particular configuration of the application; and
      in response to determining that the application fails to comply with the at least one policy, modifying a configuration of the application to be consistent with the particular configuration.

10. The method of claim 9, wherein evaluating the user supplied script further comprises determining that a registry key specified in the user supplied script exists within a registry provided by an operating system of the computing device.

11. The method of claim 9, wherein evaluating the user supplied script further comprises determining that a file specified in the user supplied script exists in a file path specified in the user supplied script.

12. The method of claim 9, further comprising performing a compliance action in response to a determination that the application fails to comply with the policy.

13. The method of claim 12, further comprising determining that the installer package for the application is available at a predefined location.

14. The method of claim 13, wherein:
the compliance action is an upgrade of the application; and
the method further comprises performing the upgrade of the application using the installer package for the application.

15. The method of claim 13, wherein:
the compliance action is an uninstall of the application; and
the method further comprises performing the uninstall of the application using the installer package for the application.

16. A non-transitory computer readable storage medium comprising one or more sequences of instructions, the instructions when executed by one or more processors causing the one or more processors to:
enroll a computing device for management by a management service by downloading and installing a management agent on the computing device, wherein the management agent enforces policies on managed applications on the computing device managed by the management service and does not enforce policies on unmanaged applications on the computing device not managed by the management service;
receive, by the management agent from the management service, a command to assume management of an application that was previously not managed by the managements service, at least one policy for the application to be managed by the management services and a user supplied script used to determine whether the application is already installed on the computing device as an unmanaged application of the unmanaged applications;
execute, by the management agent, the user supplied script received from the management service to determine whether the application is installed on the computing device as the unmanaged application by detecting a presence of a filename in a specific folder in a specific filepath specified by the user supplied script;
in an instance in which it is determined that the application is not installed on the computing device, execute an installer package specified by the at least one policy to install the application on the computing device and configure the installed application to comply with the at least one policy;
in an instance in which it is determined that the application is installed on the computing device as the unmanaged application:
evaluate the at least one policy to determine whether the application complies with the at least one policy, wherein the at least one policy specifies a particular configuration of the application; and
in response to determining that the application fails to comply with the at least one policy, modify a configuration of the application to be consistent with the particular configuration.

17. The non-transitory computer readable storage medium of claim 16, wherein the user supplied script, when evaluated by the computing device, causes the computing device to at least:
determine that a registry key specified in the user supplied script exists within a registry provided by an operating system of the computing device.

18. The non-transitory computer readable storage medium of claim 16, wherein the user supplied script, when evaluated by the computing device, causes the computing device to at least:
determine that a file specified in the user supplied script exists in a file path specified in the user supplied script.

19. The non-transitory computer readable storage medium of claim 16, wherein:
the instructions further cause the one or more processors to:
retrieve a message from a command queue provided by the management service, the message specifying that the application is to be upgraded to a new version and a predefined location for an installer package for the new version of the application; and
cause the installer package to upgrade the application to the new version of the application.

20. The non-transitory computer readable storage medium of claim 16, wherein the instructions further cause the one or more processors to prevent a user initiated uninstall of the application from the computing device.

* * * * *